United States Patent Office

2,841,539
Patented July 1, 1958

2,841,539

HEAT TREATMENT OF ELECTROPLATED URANIUM

Paul F. Hoglund, Cleveland, Ohio, assignor to the United States of America as represented by the United States Atomic Energy Commission No Drawing. Application April 1, 1946
Serial No. 658,885

4 Claims. (Cl. 204—1.5)

This invention relates to the heat treatment of metallic coatings.

Electroplatings have valuable properties not normally obtainable in coatings of the hot-dip type. Thus by electroplating methods it is possible to obtain very thin coatings of a high degree of uniformity. On the other hand metallic coatings produced by hot-dipping and like processes involving application of the metal in molten condition are superior to electroplatings with respect to porosity.

In the past it has been proposed to improve electroplatings by subjecting them to heat treatments which cause fusing or welding of the metal coatings to coated surfaces and which close the fine pores between crystals of the electroplated metal. The heat treatments may be conducted in air or inert gas or in a molten liquid such as a fused salt bath or a molten metal. Such treatments have been used with a considerable degree of success in the plating of steel and iron articles to provide corrosion-resistant coatings on the metal surface. However some base metals are so reactive that they undergo chemical change during the process, and consequently it has not been possible to obtain equally satisfactory results with these metals. An example of a metal of this class is metallic uranium. Attempts to fuse a variety of electroplated metal coatings on metallic uranium surfaces using gaseous atmospheres or salt baths have failed to produce the continuous firmly adherent coatings desired because of penetration of the coating-metal pores by the fluid to which the coatings are exposed in the treatment and the consequent corrosion of the metallic uranium and interference with the metal-to-metal union between the coating metal and base metal.

An object of the present invention is to provide a process for improving electroplatings and other porous coatings on highly reactive bases, such as metallic uranium, to reduce the porosity of such coatings and to improve the adherence of such coatings to the base metal. Further objects will be apparent from the following description of the invention and examples of its application.

In accordance with the present invention a porous coating on a highly reactive base metal is subjected to a fusion treatment at a temperature of about 250° C. to 300° C. in a silicone liquid. It has been found that fluids of this class afford protection for the base metal during the fusion process and prevent the chemical attack which leads to inferior results when ordinary baths of the type previously used in the treatment of metal-coated steel and the like are employed. The silicones, sometimes called organopolysiloxanes, may be represented by the general formula $(RR'SiO)_x$ for the ring-type structures and $Y(RR'SiO)_xZ$ for the chain-type, R and R' designating like or unlike organic radicals, for instance hydrocarbon radicals such as methyl, ethyl, propyl or their substitution derivatives, x representing the number of units in the polymer, and Y and Z designating inorganic or organic terminal elements or radicals. Products of suitably low volatility for the purposes of the invention are products of low or intermediate molecular weights of the order of 500 to 2000. Products having the molecular weight desired may be obtained either by virtue of organic radicals R and R' of high molecular weight or by virtue of a large number of units in the polymer. Alkylpolysiloxanes containing 2 to 3 carbon atoms in the alkyl groups and having molecular weights of 800 to 1000 may be used especially advantageously. While it is preferred to use silicones which do not possess substantial vapor pressure at the treatment temperatures, relatively low-boiling materials may be used by application of suitable pressure to prevent excessive boiling.

The invention is most useful in the application of protective coatings to metallic uranium. It is especially beneficial in the application of composite coatings, for example nickel-zinc, nickel-tin, nickel-copper-tin, and copper-tin coatings, such as those described in U. S. patent applications 571,673 and 572,093, filed January 6 and 9, 1954, by Allen G. Gray.

The following examples further illustrate the application of the invention. Unless otherwise indicated proportions are expressed in terms of weight.

*Example 1*

A machined uranium rod about 8 inches long and 1⅓ inches in diameter is prepared for electroplating by dipping in trichlorethylene to remove grease, sand-blasting lightly, dipping in aqueous 35% $HNO_3$ at 30° C. for 4 minutes, rinsing with cold water, etching by anodic treatment in aqueous 50% trichloracetic acid solution at between 50° C. and 60° C. for 10 minutes at 50 amperes per square foot current density, rinsing with cold water, dipping for 4 minutes in cold aqueous 35% $HNO_3$ solution to clean the etched metal surface, and then rinsing in cold water.

The cleaned etched metal rod is immediately electroplated in a copper pyrophosphate electroplating bath comprising 75 grams per liter of copper as pyrophosphate at a current density of 25 amperes per square foot at 60° C. with air agitation until a copper plating about 0.001 inch thick is formed (about 60 minutes).

Since the copper electroplating is not as impervious as desirable for certain purposes, it is improved in this respect by plating in an aqueous tin electroplating bath comprising 90 grams per liter of sodium stannate at a current density of 25 amperes per square foot until a tin plating about 0.0001 inch thick has formed (about 10 minutes), and then rinsing and drying.

The plated rod is finally heated at 300° C. for about 3 hours in a liquid organopolysiloxane (a silicone oil) bath to cause the tin to diffuse into the pores of the copper plating. The rod is removed from the bath, allowed to cool, then wiped to remove most of the silicone fluid, immersed in chloroform to remove the remainder, and dried.

*Example 2*

Two sets of metallic uranium rods were prepared and electroplated as described in Example 1 with 0.001 inch of copper and 0.0001 inch of tin, both sets being plated under identical conditions. One set was heat-treated in a liquid organopolysiloxane (a silicone oil), at 300° C. for three hours and the other set was heat-treated in an inert chlorinated hydrocarbon liquid for the same time at the same temperature. Exposed to water at 35° C. all rods of the set treated in the chlorinated hydrocarbon showed failure in 3 to 10 days and all platings were badly undercut. Of the silicone-treated rods only one showed failure after 91 days and none showed any undercutting of the plating.

Comparisons of electroplatings treated in silicone with platings treated in fused salt mixtures such as sodium-lithium-potassium chloride eutectic showed a similar superiority of the silicone-treated platings.

Example 3

A machined uranium rod was prepared for electroplating by dipping in carbon tetrachloride to remove grease, sand-blasting lightly, dipping in aqueous 35% $HNO_3$ at 30° C. for four minutes, rinsing with cold water, etching by anodic treatment in aqueous 50% trichloracetic acid solution at between 50° C. and 60° C. for ten minutes at 50 amperes per square foot current density, rinsing with cold water, dipping for four minutes in cold aqueous 35% $HNO_3$ solution to clean the etched metal surface, and then rinsing in cold water. The cleaned, etched metal rod was immediately plated in a nickel sulfate electroplating bath (containing per liter 240 grams $NiSO_4 \cdot 7H_2O$, 45 grams of $NiCl_2 \cdot 6H_2O$, and 30 grams of $H_3BO_3$) at a current density of 25 amperes per square foot at 40° C. until a nickel plating 0.0007 inch thick was formed (about 40 minutes). The rod was removed from the electroplating bath, rinsed with water and plated in a tin electroplating bath (containing per liter, 91 grams $SnSO_4$, 30 grams 95% $H_2SO_4$, 30 grams tartaric acid, 3 grams glue, and 6 grams cresol). It was electroplated in this bath at a temperature of 30° C. and a current density of about 25 amperes per square foot for a time sufficient to apply 0.0002 inch of tin (about 5 minutes). The rod was washed and dried.

The plated rod was then immersed for two hours at 300° C. in a liquid organopolysiloxane (a silicone oil) and cooled and dried as in Example 1. In a 40-day test period at 35° C. there was no failure of the coating.

Example 4

Uranium rods, prepared and nickel-plated as described in Example 3, were rinsed and plated in a zinc electroplating bath (containing 360 grams per liter $ZnSO_4 \cdot 7H_2O$, 15 grams per liter $CH_3COONa \cdot 3H_2O$ (sodium acetate), and 120 grams per liter of glucose) at 30° C. and 40 amperes per square foot current density, until a 0.0003 inch layer of zinc had been applied. The plated rods were washed, dried and treated for three hours in a liquid organopolysiloxane (a silicone oil) at 300° C. The rods were cooled and dried as described in Example 1. Only one of twelve such coatings failed in a test period of 75 days at 35° C.

Example 5

A metallic uranium rod prepared as described in Example 1 is electroplated in a nickel sulfate electroplating bath at 45° C. at a current density of 25 amperes per square foot for 20 minutes using an agitated cathode. The rod with a 0.0003 inch nickel plating is rinsed first in cold water, then in hot water (to raise its temperature) and then electroplated in a copper pyrophosphate bath at 55–60° C. for 12 minutes at a current density of 25 amperes per square foot to provide a 0.002-inch copper plating. It is then rinsed in hot water and electroplated in a sodium stannate bath (containing per liter 90 grams $Na_2SnO_3 \cdot H_2O$, 7½ grams $NaOH$, 15 grams $CH_3COONa \cdot 3H_2O$), and ½ gram $H_2O_2$) at 75–80° C. for 7 minutes at a current density of 25 amperes per square foot. This provides a tin plating about 0.00005 inch thick.

The plated rod is rinsed and dried first in cold air, then in hot air and the dry rod is immersed in silicone fluid as in Example 1, removed, cooled, and dried.

It will be understood that I intend to include variations and modifications of the invention and that the preceding examples are illustrations only and in no wise to be construed as limitations upon the invention, the scope of which is defined in the appended claims, wherein I claim:

1. The method of rendering an electroplated coating of a high-melting metal on a metallic uranium article impervious, said high-melting metal being selected from the group consisting of copper and nickel, which comprises applying to the high-melting metal electroplated coating an electroplated coating of a low-melting metal of the group consisting of tin and zinc and immersing the electroplated article in a liquid organopolysiloxane of a molecular weight of between 500 and 2000 and selected from the group consisting of a ring-type compound corresponding to the formula $(RR'SiO)_x$ and a chain-type compound corresponding to the formula $$Y(RR'SiO)_xZ$$

wherein R and R' designate organic radicals selected from the group consisting of methyl, ethyl and propyl radicals, $x$ designates the number of units in the polymer, and Y and Z designate a terminal member selected from the group consisting of elements and radicals, said organopolysiloxane being maintained at a temperature between 250 and 300° C. and the immersion being for a period of time sufficient to cause diffusion of the low-melting metal into the electroplated coating of the high-melting metal.

2. The process of claim 1 wherein the high-melting metal is copper, and the low-melting metal is tin, the time of immersion is three hours and the temperature of the organopolysiloxane is 300° C.

3. The process of claim 1 wherein the high-melting metal is nickel, and the low-melting metal is tin, the time of immersion is two hours and the temperature of the organopolysiloxane is 300° C.

4. The process of claim 1 wherein the high-melting metal is nickel, and the low-melting metal is zinc, the time of immersion is three hours and the temperature of the organopolysiloxane is 300° C.

References Cited in the file of this patent
UNITED STATES PATENTS

| | | |
|---|---|---|
| 626,994 | Francis | June 13, 1899 |
| 2,258,218 | Rochow | Oct. 7, 1941 |
| 2,304,709 | Rubin | Dec. 8, 1942 |
| 2,335,012 | Johnson | Nov. 23, 1943 |
| 2,381,778 | Shoonmaker et al. | Aug. 7, 1945 |
| 2,384,384 | McGregor et al. | Sept. 4, 1945 |
| 2,418,088 | Nachtman | Mar. 25, 1947 |

OTHER REFERENCES

"Plastics" (of Chicago), January 1945, pp. 44, 112, 113.

"Materials and Methods," October 1945, p. 1073.

Transactions of the Electrochemical Society, vol. 66 (1935), p. 41.

"An Introduction of the Chemistry of the Silicones," by E. C. Rochow, 2nd ed., John Wiley & Sons, New York, N. Y., 1951, pp. 87, 88, 184–186.